(12) United States Patent
Bohn et al.

(10) Patent No.: US 8,997,613 B2
(45) Date of Patent: Apr. 7, 2015

(54) METHOD AND DEVICE FOR TRIMMING HEAVY PLATES

(75) Inventors: Andreas Bohn, Hilchenbach (DE); Thomas Baur, Hilchenbach (DE); Ulrich Meinhardt, Hilchenbach (DE)

(73) Assignee: SMS Siemag Aktiengesellschaft, Duesseldorf (DE)

( * ) Notice: Subject to any disclaimer, the term of this patent is extended or adjusted under 35 U.S.C. 154(b) by 157 days.

(21) Appl. No.: 13/704,672

(22) PCT Filed: Jun. 20, 2011

(86) PCT No.: PCT/EP2011/060260
§ 371 (c)(1),
(2), (4) Date: Feb. 11, 2013

(87) PCT Pub. No.: WO2011/157853
PCT Pub. Date: Dec. 22, 2011

(65) Prior Publication Data
US 2013/0133492 A1 May 30, 2013

(30) Foreign Application Priority Data
Jun. 19, 2010 (DE) .......................... 10 2010 024 403

(51) Int. Cl.
*B23D 31/04* (2006.01)
*B23D 15/04* (2006.01)
*B23D 31/00* (2006.01)
*B23D 35/00* (2006.01)

(52) U.S. Cl.
CPC .............. *B23D 31/04* (2013.01); *B23D 31/008* (2013.01); *B23D 35/005* (2013.01)

(58) Field of Classification Search
USPC ............................. 83/694, 640, 641, 23, 301
See application file for complete search history.

(56) References Cited

U.S. PATENT DOCUMENTS

| | | | |
|---|---|---|---|
| 2,160,999 A | 6/1939 | Yoder | |
| 3,667,335 A | 6/1972 | Hamacher | |
| 3,795,167 A | 3/1974 | Fries | |
| 4,079,649 A | 3/1978 | Ishii | |
| 4,507,997 A * | 4/1985 | Ikeda | 83/640 |
| 4,674,378 A * | 6/1987 | Kawano et al. | 83/368 |
| 2009/0165626 A1* | 7/2009 | Sundquist et al. | 83/694 |
| 2012/0272806 A1* | 11/2012 | Baur et al. | 83/561 |

FOREIGN PATENT DOCUMENTS

| | | |
|---|---|---|
| DE | 288452 | 3/1913 |
| DE | 1627268 | 12/1970 |
| DE | 3007931 | 9/1981 |

(Continued)

*Primary Examiner* — Stephen Choi
(74) *Attorney, Agent, or Firm* — Abelman, Frayne & Schwab (57) ABSTRACT

With known trimming shears having a pair of scrap-cutting blades on the discharge side, the moving upper scrap-cutting blade must be moved as closely as possible past the trimmed plate edge in order to push the cutoff edge still hanging on the plate downward against the lower fixed scrap-cutting blade, which requires precise adjustment of the upper scrap-cutting blade. To that end, according to the invention, the distance between the upper scrap-cutting blade (2) or the lower scrap-cutting blade (3) and the trimming blade plane (5) is set prior to trimming in accordance with the thickness of each heavy plate (10) to be trimmed by displacement of the upper scrap-cutting blade (2) and/or the lower scrap-cutting blade (3) in a displacement direction with at least one component transverse to the trimming blade plane (5).

4 Claims, 7 Drawing Sheets

(56) References Cited

FOREIGN PATENT DOCUMENTS

| | | |
|---|---|---|
| RU | 2 286 865 | 3/2006 |
| RU | 58 969 | 12/2006 |
| SU | 1 252 077 | 8/1986 |
| WO | 20008037239 | 4/2008 |

* cited by examiner

METHOD AND DEVICE FOR TRIMMING HEAVY PLATES

The invention relates to a method of and a device for trimming heavy plates with heavy plate shears having trimming blades that span a trimming blade plane. With the method and the device, scrap edges which are formed during trimming are cut up in short scrap pieces with scrap-cutting blades which are arranged behind the trimming blades transverse thereto and are secured on a scrap-cutting blade carriage supported in a guide for the scrap-cutting blade carriage.

Heavy plate shears for heavy plates and having trimming blades for trimming plate rims with transversely arranged thereto, scrap-cutting blades for cutting off trimming edges or scrap edges already separated from the plate, are generally known.

Thus, German Laid-Open Application 1 907 717 discloses trimming shears for rolled plates and in which the upper transverse blade (scrap-cutting blade) has its own drive, and the cutting edge of the lower transverse blade lies at a lower level than the cutting edge of the stationary lower trimming blade. The upper transverse blade is carried by a pivotal lever which is supported on a pivot axle arranged beneath the cutting edge of the lower transverse blade somewhat parallel to the trimming blade.

German Publication 2 122 855 discloses plate shears for trimming plates and having a stationary lower blade support for the lower trimming blade and an upper blade support for the upper trimming blade and which performs a rocking movement, and a transverse blade pair arranged at the discharge side and the upper transverse blade of which is displaced by the rocking movement of the upper blade support. The upper transverse blade is arranged on its own blade slide displaceable within the side guides for the upper blade support and hingedly secured at the outer end of the upper blade support with a pin.

DE 26 58 068 A discloses trimming shears having a trimming blade secured on a lower blade support for cutting side edges of a steel plate, and an upper trimming blade holder that is so supported on first and second eccentrics by pushrods that the upper trimming blade, which is secured on the upper trimming blade holder, is pivotally movable, the shears further having a transverse blade secured with a pushrod with a third eccentric, and a lower transverse blade arranged on a lower blade holder and extending in the feeding or forward direction of the steel plate beneath the trimming blade, wherein all of the eccentrics are supported on a common crankshaft the axis of which extends parallel to the feeding direction of the steel plate. The radius and the angle of the eccentricity of the third eccentric is predetermined in a suitable manner before the radius and the angle of the eccentricity of the first and second eccentrics are.

It is common for known trimming shears with discharge side scrap-cutting blade pair that the movable upper scrap-cutting blade must move as closely as possible past the trimmed plate edge in order to push the cut-off trimming edge still hanging on the plate downwardly against the lower fixed scrap-cutting blade, which requires a precise adjustment of the scrap-cutting upper blade after each exchange of the blades. If the scrap-cutting upper blade is mounted too close to the trimmed edge of the heavy plate, the trimmed plate edge can be damaged. If contrary to that, it is mounted too remotely, its cutting edge does not cover the entire width of the trimmed edge.

For the usable life of shears and blades, it is advantageous to increase the blade clearance at an increased thickness of the plate. Then, during the trimming cut, the cut-off edge will be, dependent on the material of the heavy plate, steeper than with a smaller blade clearance. However, this makes it necessary to increase the distance of the upper scrap-cutting blade to the heavy plate or its trimmed edge because otherwise the upper scrap-cutting blade would damage the cut-off edge of the heavy plate, vice versa, at small plate thicknesses and a smaller blade clearance, the distance should not be too big because otherwise the scrap edges would not be completely cut off.

Proceeding from the described above state-of-the art, the object of the invention is a method and a device which would eliminate the above-described difficulties encountered during trimming of variable plate thicknesses.

This object is achieved with characterizing features of claim 1 in that a distance between the scrap-cutting upper blade and the trimming blade plane and/or a distance between the scrap-cutting lower blade and the trimming blade plane is adjusted before a respective trimming process, dependent on a thickness of a respective to-be-trimmed plate, by displacement of the scrap-cutting upper blade and/or the scrap-cutting lower blade in a displacement direction, with at least one component transverse to the trimming blade plane.

Generally, the displacement direction of the scrap-cutting blade is represented by the displacement vector. This vector preferably lies in a plane extending parallel to the top or bottom surface of the to-be-trimmed heavy plate. With the displacement claimed in claim 1, according to the invention, it is insured that the displacement vector has at least one component extending transverse to the trimming blade plane. This does not exclude that the displacement vector can have another component extending in another direction, as it would be claimed in the dependent claims. The claimed, according to the invention, displacement, must not inevitably or exclusively take place transverse to the trimming plane.

Within the scope of the invention, the term "trimming blade plane" should be considered synonymous with terms "trimming blade edge," "trimming plane," "plane of trimming edge," or "plane in the longitudinal direction and transverse to the upper surface of the heavy plate along the trimming edge".

The claimed possibility for the user of the method of variable/flexible adaptation of the distance between the upper scrap-cutting blade and the trimming blade plane and/or the distance between the lower scrap-cutting blade and the trimming blade plane dependent on the thickness of the to-be-trimmed heavy plate before each trimming process, provides an advantage consisting in that damages of the trimmed plate edge or an insufficient overlap of the to-be-trimmed scrap edge by the cutting edge of the scrap-cutting blade are eliminated to a most possible extent.

According to a first embodiment of the invention, in addition to the distance between the scrap-cutting blades and the trimming blade plane, also the scrap-cutting blade clearance is adjusted dependent on the thickness of the to-be-trimmed heavy plate by additional displacement of the scrap-cutting blades relative to each other in the displacement direction, with a further component transverse to a scrap-cutting blade plane which is spanned by the scrap-cutting blades. The adaptation of the scrap-cutting blade clearance to the thickness of the to-be-cut scrap edge provides an advantage consisting in that the useful life of the scrap-cutting blades increases.

The term "scrap-cutting blade plane" within the meaning of the invention is synonymous with the terms "scrap-cutting blade edge" or "plane perpendicular to the upper surface and transverse to the longitudinal direction of the heavy plate at the height of the scrap-cutting blade."

The displacement of the scrap-cutting blade in direction of both components can timewise take place one after another or simultaneously. The start or end position of the guide for scrap-cutting blade slide will be the same for both alternatives.

According to a further embodiment of the scrap-cutting device, the scrap-cutting upper blade or the scrap-cutting lower blade is secured in a carriage displaceable in a guide for the scrap-cutting blade carriage by a drive device.

The guide for the scrap-cutting blade carriage is so operationally connected with at least one stationary eccentric shaft of the drive device and which, preferably, extends perpendicular to the upper surface of the heavy plate, that upon rotation of the eccentric shaft, the guide for the scrap-cutting blade carriage is simultaneously displaced in two, e.g., mutually perpendicular, different directions, e.g., in the direction transverse to the trimming blade plane and transverse to the scrap-cutting blade plane.

With corresponding design and dimensioning of the eccentric shaft, alternatively, it is possible to adjust in advance different displacement lengths and displacement ratios.

The above-mentioned object is further achieved with a device according to claim 6. The advantages of this solution correspond to above-mentioned advantages discussed with reference to the claimed method.

Further particularities, features, and advantages of the present invention will be discussed in detail based on an embodiment shown in schematic drawings. The drawings show.

In all of the figures the same technical features are designated with the same reference numerals.

Figure 1A:
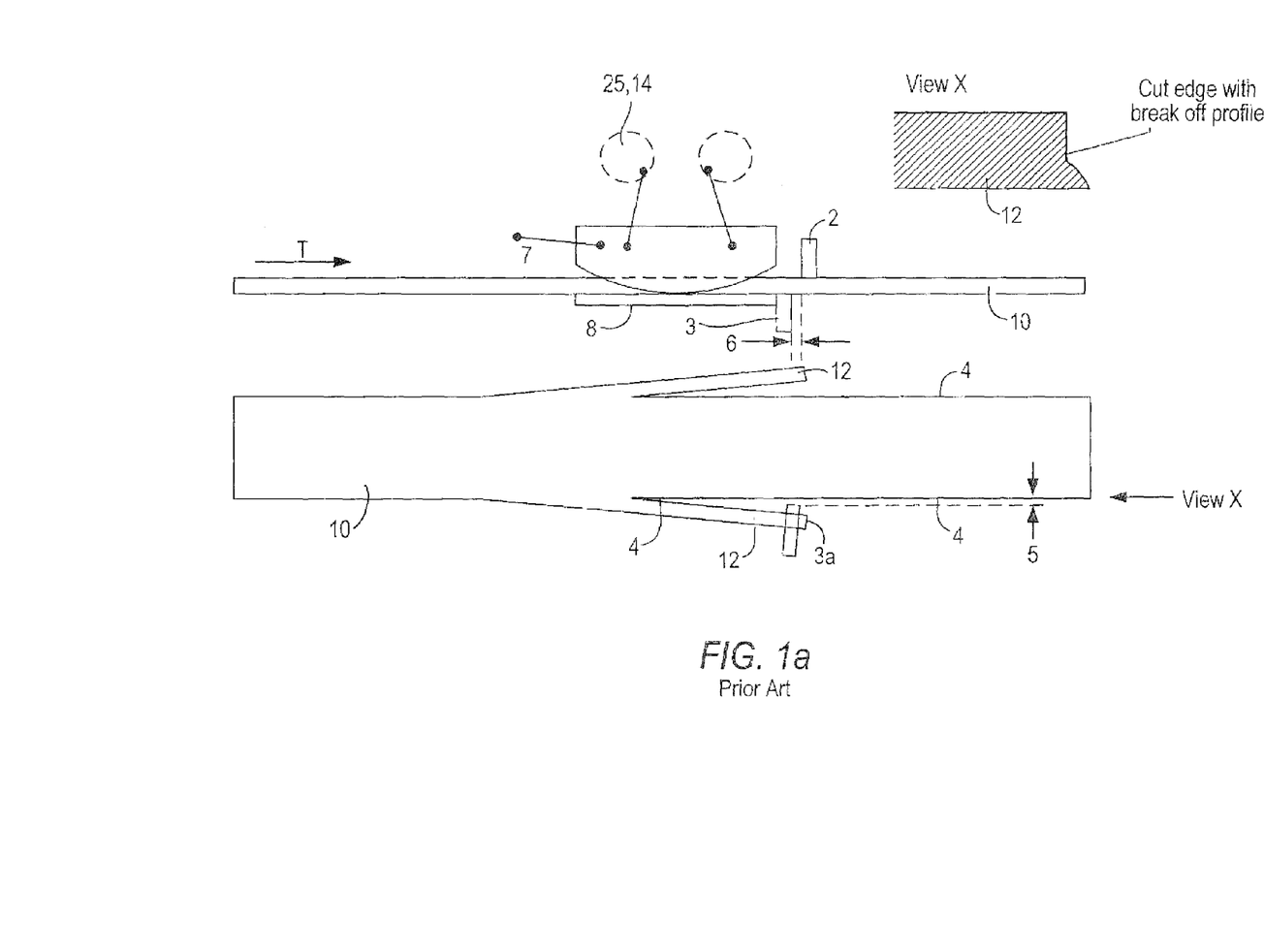
FIG. 1a a device for trimming heavy plates according to the state-of-the-art.
Figure 1B:
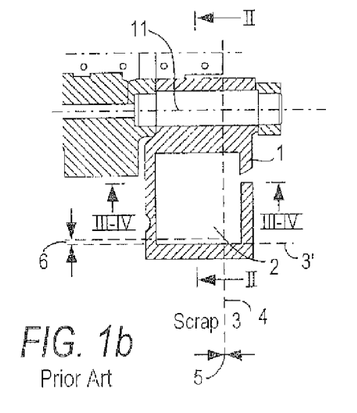
FIG. 1b a horizontal cross-sectional view of a guide for a scrap-cutting blade carriage according to the state-of-the art.

FIGS. 1a and 1b show different views/cross-sections of a device for trimming plates according to the state-of-the art. As shown in the transportation direction of a heavy plate, the scrap-cutting blades (shown are upper scrap-cutting blade 2 and lower cutting blade 3 with a lower scrap-cutting blade edge) are located behind the trimming blades 7, 8 and transverse thereto. The upper scrap-cutting blade 2 is secured on a scrap-cutting blade carriage, see FIG. 1b), which is held and guided in a guide 1 for the scrap-cutting blade carriage. The guide 1 for the scrap-cutting blade carriage is supported at its bottom on a horizontally extending eccentric shaft 11 by rotation of which, the width of the scrap-cutting blades clearance can be adjusted.

The upper scrap-cutting blade 2 is spaced horizontally from the trimming blade by a predetermined constant distance 5 for cutting scrap strips of both thick plates 10 and thin plates. FIG. 1b shows the scrap-cutting blade clearance 6 and the distance 5 between the upper scrap-cutting blade 2 and the trimming blade edge 4. The greater is the plate thickness, the greater are the scrap blade clearance 6 and the distance 5 between the upper scrap-cutting blade and the trimming blade which need be selected.

Figure 2:
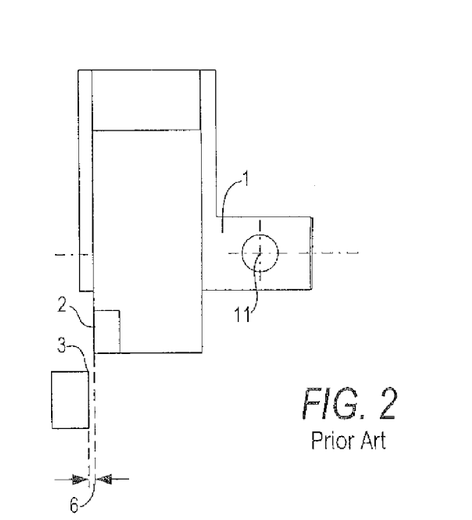
FIG. 2 a vertical cross-sectional view of the guide for the scrap-cutting blade carriage shown in FIG. 1b)

FIG. 2 shows a vertical cross-sectional view of the guide for the scrap-cutting blade carriage 1 shown in FIG. 1. It shows the position of scrap-cutting blades 2, 3 and of the horizontally extending eccentric shaft 11 relative to the scrap-cutting blade carriage 1.

FIGS. 3 through 6 show horizontal cross-sectional views pivoted by 90° relative to FIG. 2. With a pivoted view, the trimming blade 7, the trimming blade 8, and the trimming blade clearance 9 can be clearly seen, respectively.

Figure 3:
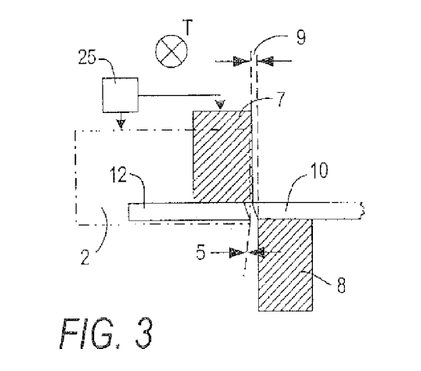
FIG. 3-6 horizontal cross-sectional views pivoted by 90° relative to FIG. 2.

With the arrangement of FIG. 3, a scrap edge 12 can be cut off from a thin plate 10 without difficulties at a small distance from the scrap-cutting upper blade to the trimming blade and at a small trimming blade clearance 9.

Figure 4:
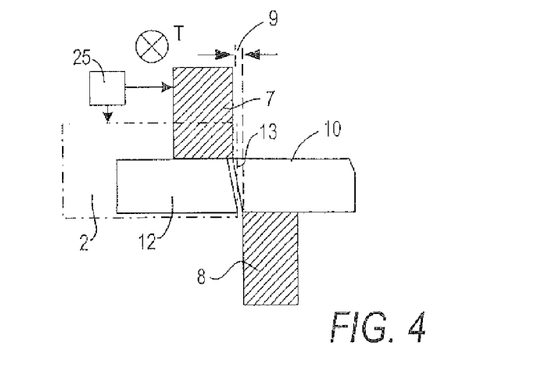

For a thick plate 10, with a correspondingly greater trimming blade clearance 9, the scrap-cutting upper blade 2 produces, as shown in FIG. 4, an undesirable damage 13 at the trimming edge of the plate 10.

Figure 5:
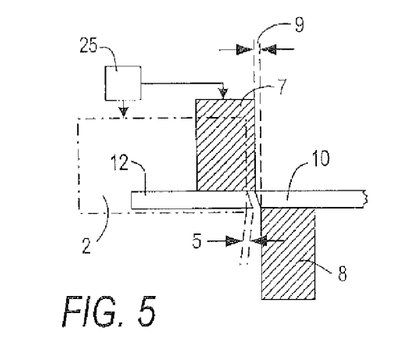

In FIG. 5, at the same trimming blade clearance 9 as in FIG. 3, the distance 5 between the scrap-cutting upper blade and the trimming blade increases. With a thin plate 10, this leads to that, eventually, the scrap edge is not completely cut off and has a non-complete cut-off point.

Figure 6:
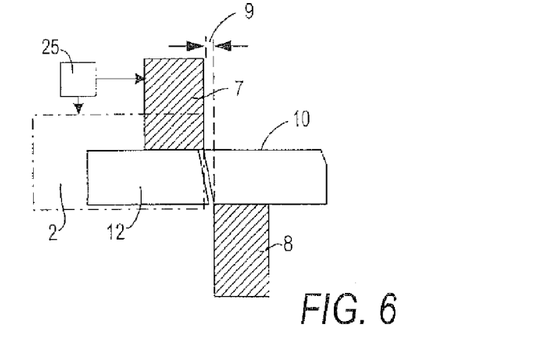

With the arrangement of FIG. 6, finally a scrap edge 12 can be cut off from a thick plate 10 without difficulties at an increased trimming blade clearance 9 corresponding to FIG. 4 and a distance between the scrap-cutting upper blade 2 and the trimming blade corresponding to FIG. 5.

In summary, the techniques shown in FIGS. 3 through 6 emphasizes that during transition from cutting thin plates 10 with the arrangement of FIG. 3 to cutting thick plates 10 with the arrangement of FIG. 6, the scrap-cutting blade clearance 6 and the distance between the scrap-cutting upper blade 2 and the trimming blade edge 4 must be increased and vice versa.

Those are carried out, dependent on change of the thickness of the heavy plates 10, according to an advantageous embodiment of the invention, with the aid of at least one eccentric shaft 21 which is preferably stationary transversely arranged but rotatably supported, as shown in FIGS. 7-11.

Figure 7:
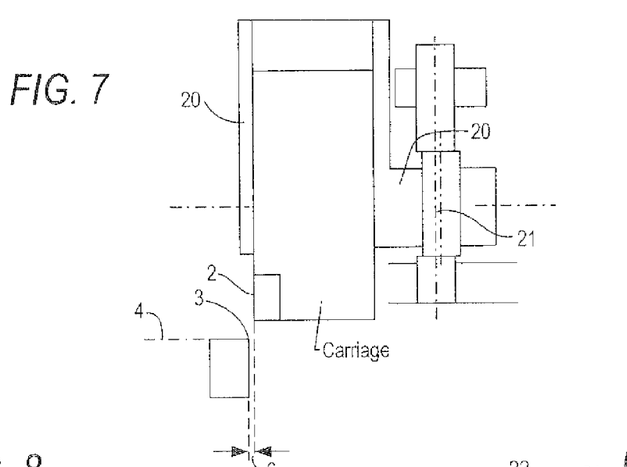
FIG. 7 a vertical cross-sectional view of the guide for the scrap-cutting blade carriage.

FIG. 7 shows a guide 20 according to the invention for a scrap-cutting blade carriage and corresponding to the vertical cross-sectional view of FIG. 2, and with which the scrap-cutting blade clearance 6 of the scrap-cutting blades 2, 3 is changeable with the eccentric shaft 21. The simultaneously carried-out change of the distance 5 between the scrap-cutting upper blade 2 and trimming blade edge 4 likewise effected with the eccentric shaft 21, is not seen in FIG. 7 but would be clearly seen in the following cross-sectional views of FIGS. 8 through 11 corresponding to FIG. 1.

Figure 8:
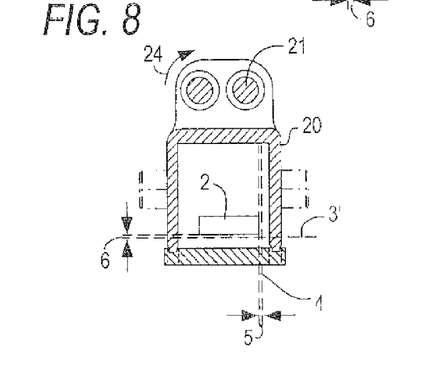
FIG. 8-11 horizontal cross-sectional views of the guide for the scrap-cutting blade shown in FIG. 7.
Figure 9:
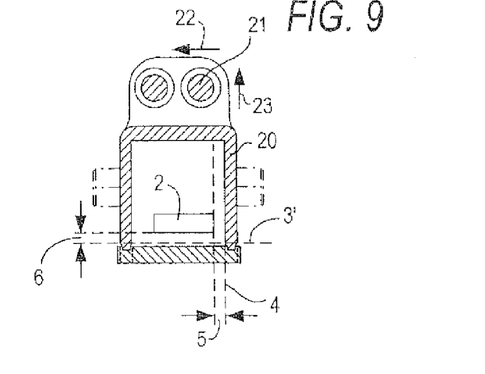

In FIGS. 8 and 9, the guide 20 for the scrap-cutting blade carriage is supported by two, transversely arranged, stationary eccentric shafts 21. For trimming thin plates 10, the pivot joint of the eccentric shafts 21 is in a 12-o'clock position in the arrangement of FIG. 8. By rotating the eccentric shafts 21 clockwise, as shown with reference numeral 24, a 3-o'clock position shown in FIG. 9 is reached, wherein the guide 20 for the scrap-cutting blade carriage is displaced away from the scrap-cutting lower blade or from the scrap-cutting lower blade edge 3' in direction 23 and, simultaneously, is displaced away from the trimming blade edge 4 in direction 22. From comparison of both FIGS. 8 and 9, it can be clearly seen that by rotation in the direction 24, a simultaneous increase of the scrap-cutting blade clearance 6 and of the distance 5 between the scrap-cutting upper blade 2 and the trimming blade edge 4 is achieved, a position advantageous for trimming thick plates 10.

The displacement is reversible by a corresponding rotation of the eccentric shafts 21 in opposite directions, which provides for intermediate positions, so that the position of the guide 20 for the scrap-cutting blade carriage can be adapted to different plate thickness in simple, rapid, and cost-saving manner.

Figure 10:
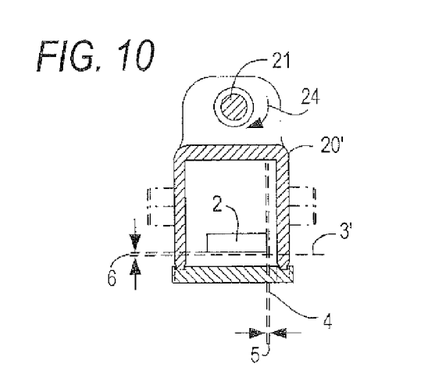
Figure 11:
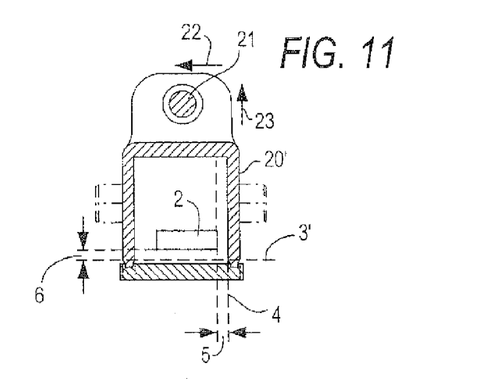

In the same way, this described displacement of the guide 20' of the scrap-cutting blade carriage can be achieved with a single eccentric shaft 21 by rotation of the same, as shown, by way of examples, in FIGS. 10 and 11.

Figure 12:
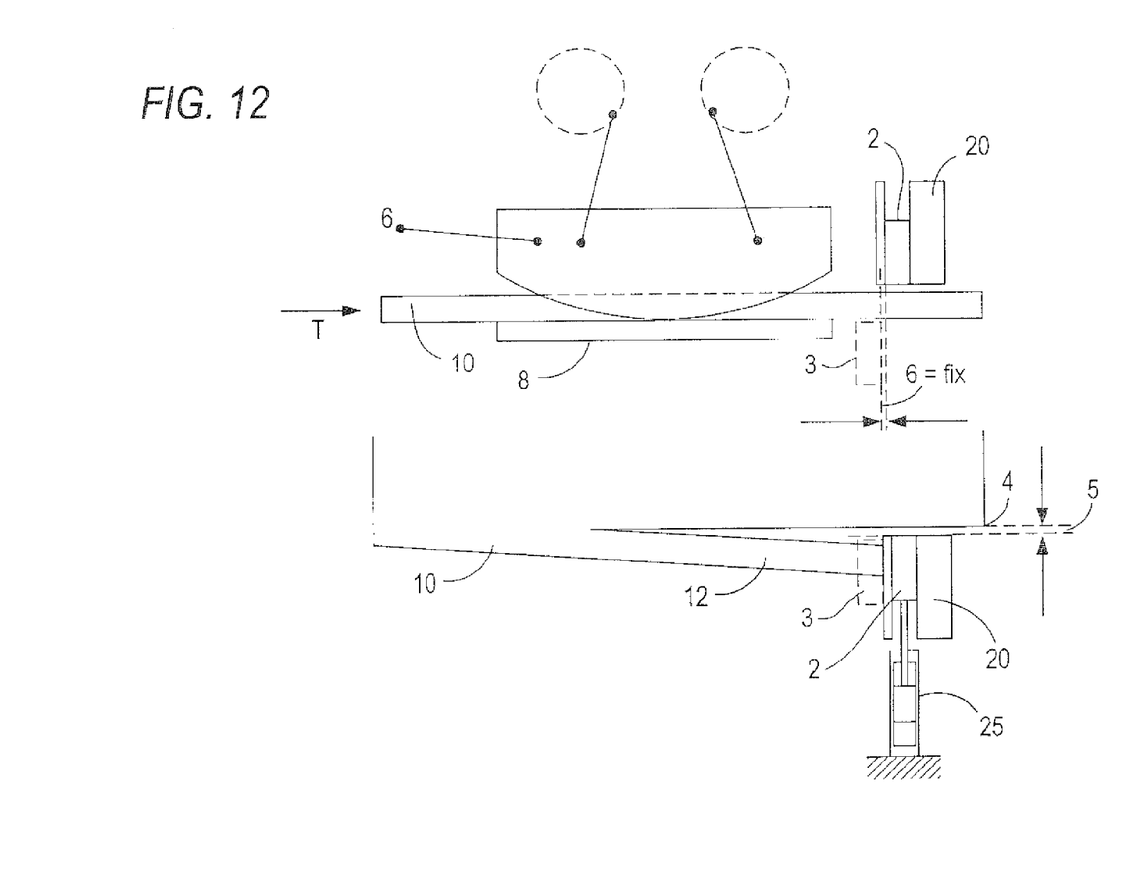
FIG. 12-15 respective plan view and vertical cross-sectional view of the device according to the present invention with a further embodiment of the drive device and the scrap-cutting device.

FIG. 12 shows a vertical view and a plan view of the inventive device, wherein the drive device 25 for the scrap-cutting upper blade 2 is formed, e.g., as a piston-cylinder unit. The drive device 25 is so aligned that it displaces, e.g., the scrap-cutting blade 2 transverse to the trimming blade plane 4 and, thereby, changes the distance 5 between the scrap-cutting blade and the trimming blade plane 4.

Figure 13:
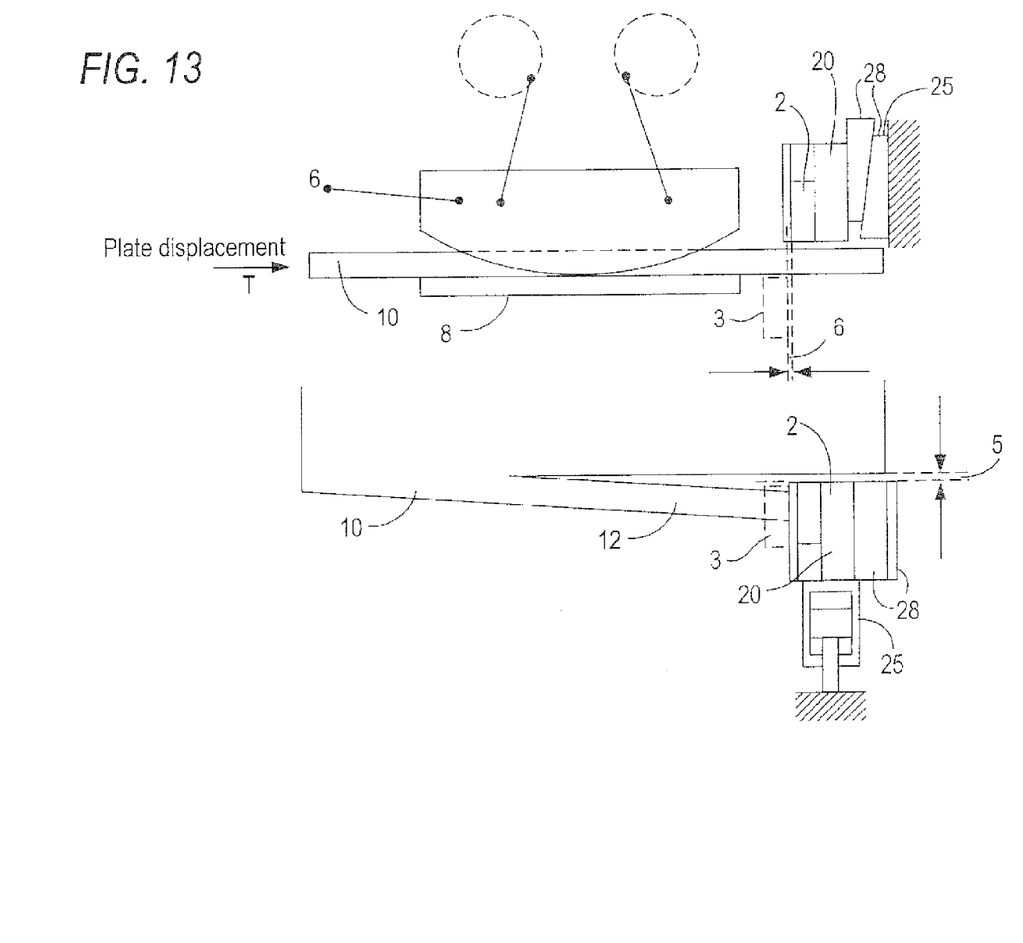

FIG. 13 shows a further embodiment of the drive device according to the present invention, wherein this drive has, in addition to the piston-cylinder unit, also a wedge arrangement 28 for changing the scrap-cutting blade clearance 6 dependent on the thickness of the trimmed plate. As can be seen in FIG. 13, displacement of the wedge in a displacement direction transverse to the surface of the to-be-trimmed plate causes the above-mentioned change of the scrap-cutting blade clearance. In the embodiment shown in FIG. 13, the piston-cylinder unit causes not only displacement of the scrap-cutting upper blade 2 but rather of the entire carriage guide 20 with the carriage and the wedge arrangement 23 which is operatively connected with the carriage guide and, optionally, forms, together with the carriage guide, a constructional unit.

Figure 14:
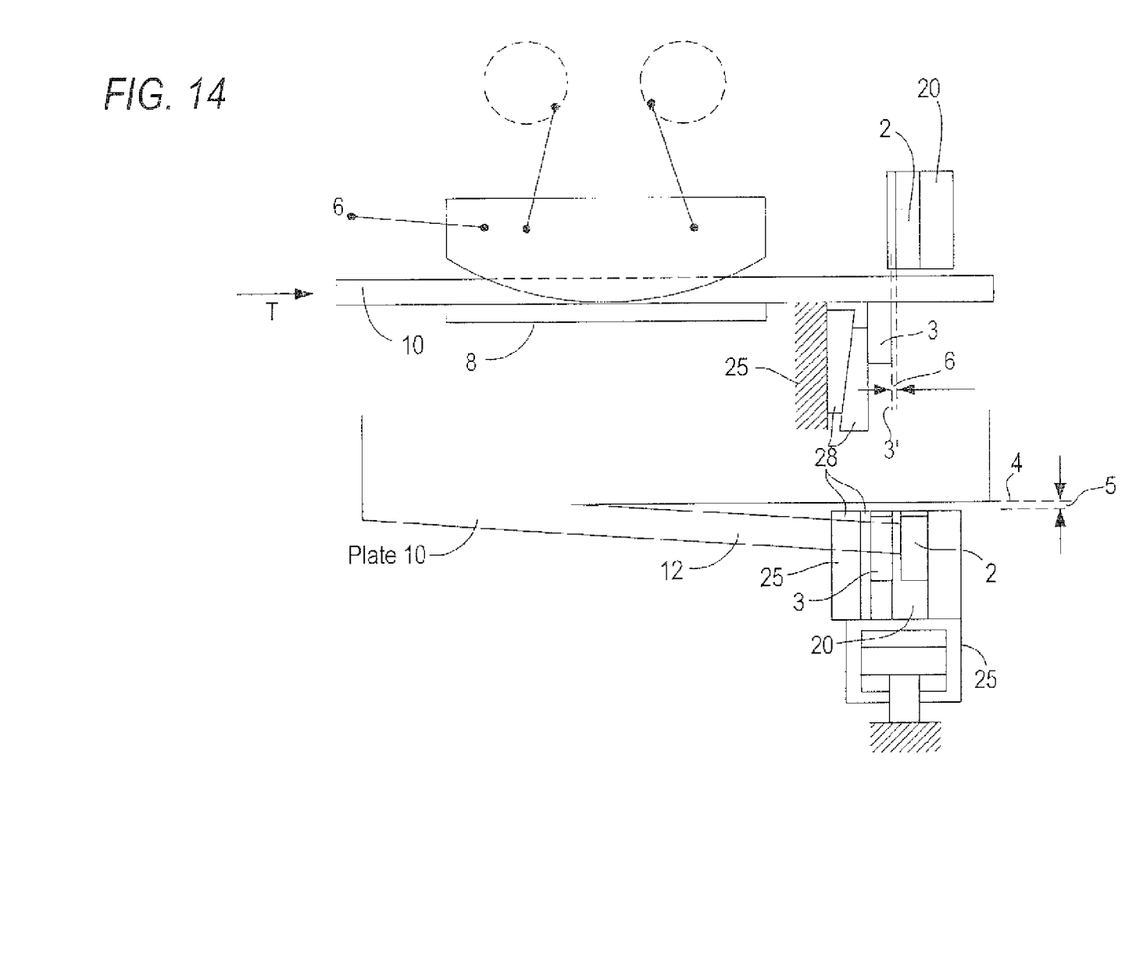

FIG. 14 shows an embodiment of a drive device 25 that influences the scrap-cutting upper blade 2 analogous to that of FIG. 13, however, in distinction from FIG. 13, it causes displacement of the scrap-cutting lower blade transverse to the trimming plane. With construction limitations, the piston-cylinder unit enables a simultaneous displacement of both the scrap-cutting upper blade and the scrap-cutting lower blade. The wedge arrangement 28 works in FIG. 14, contrary to FIG. 13, not on the scrap-cutting upper blade but rather on the scrap-cutting lower blade. It enables a change of the scrap-cutting blade clearance 6 with respect to the scrap-cutting blade guide with the carriage and the scrap-cutting upper blade which according to FIG. 14, can be stationary arranged in or opposite to the transportation direction. The piston-cylinder unit provides for, preferably, not only displacement of the scrap-cutting upper and lower blades in a direction transverse to the trimming blade plane, but also, preferably simultaneously, a joint displacement of the wedge arrangement 28.

Figure 15:
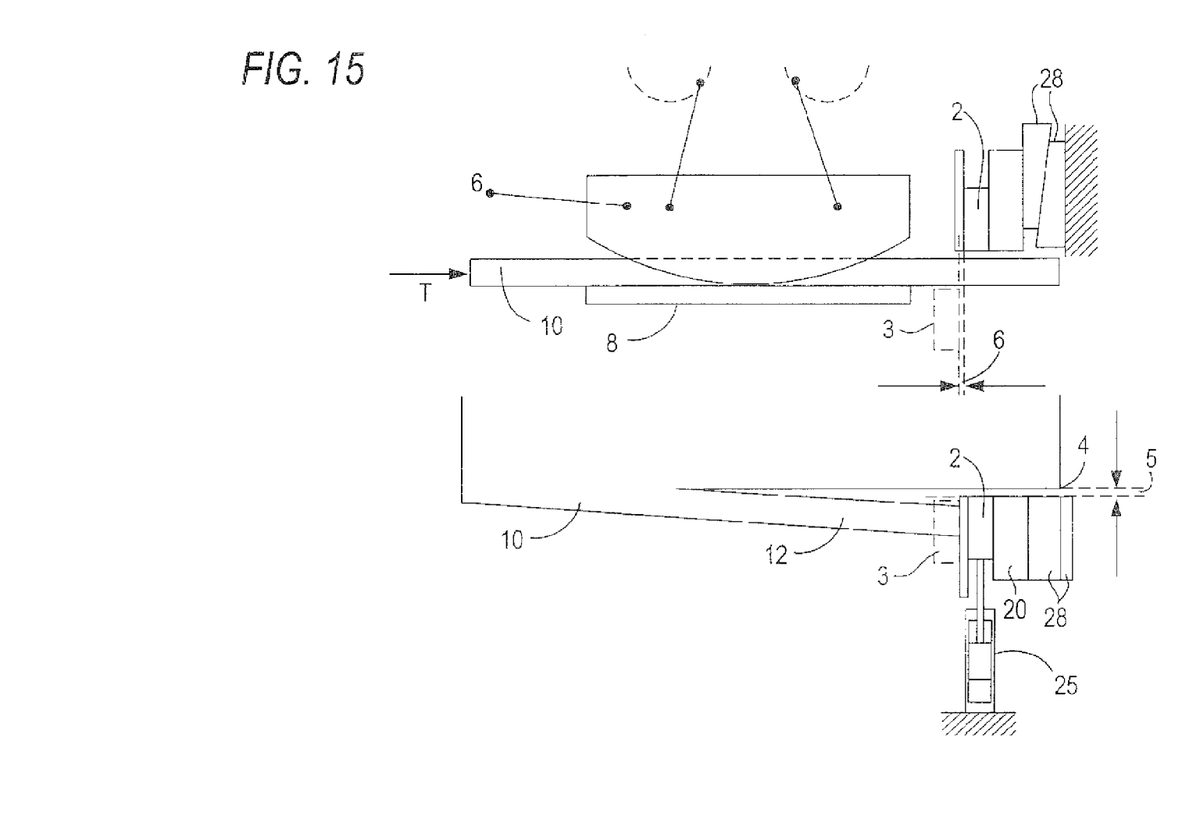

FIG. 15 shows a further embodiment of the drive device 25, wherein the piston-cylinder unit, exactly as in FIG. 12, is operationally connected with the scrap-cutting upper blade, and the additionally available wedge arrangement 28 is not operationally connected with the piston-cylinder unit and, thus, is not displaced together with the scrap-cutting upper blade transverse to the trimming plane 4.

LIST OF REFERENCE NUMERALS

1 Guide of the scrap-cutting blade carriage according to the state-of-the art
2 Scrap-cutting upper blade
3 Scrap-cutting lower blade
4 Trimming blade edge
5 Distance between the scrap-cutting upper blade and the trimming blade edge
6 Scrap-cutting blade clearance
7 Upper trimming blade
8 Lower trimming blade
9 Trimming blade clearance
10 Heavy plate
11 Horizontal eccentric shaft
12 Scrap edge
13 Damage
14 Non-complete cutting location
15 Guide of scrap-cutting blade carriage of the invention with or without eccentric shaft
20' Guide of scrap-cutting blade carriage of the invention with or without eccentric shaft
21 Stationary transversely extending eccentric shaft
22 Direction of the change of the distance scrap-cutting blade-trimming blade edge
23 Direction of change of the scrap-cutting blade clearance
24 Rotation of the eccentric shaft
25 Drive device
28 Wedge arrangement
T Transportation direction

The invention claimed is:

1. A method of trimming heavy plates (10) with heavy plate shears that have trimming blades (7, 8) spanning a trimming blade plane (4); wherein scrap edges (12) produced during trimming are cut off in scrap pieces by a scrap-cutting device arranged, in a transportation direction of a heavy plate, behind the trimming blades (7, 8) and having a scrap-cutting upper blade and a scrap-cutting lower blade, and wherein the scrap-cutting upper blade and the scrap-cutting lower blade span a scrap-cutting plane, characterized in that a distance (5) between the scrap-cutting upper blade and the trimming blade plane (4) is adjusted before a respective trimming process dependent on a thickness of a respective to-be-trimmed plate (10) by displacement of the scrap-cutting upper blade in a displacement direction, with at least one component transverse to the trimming blade plane (4);

in that in addition to the distance (5) between the scrap-cutting upper blade and the trimming blade plane (4), also the scrap-cutting blade clearance (6) is adjusted dependent on the thickness of the to-be-trimmed heavy plate (10), by displacement of the scrap-cutting upper blade in the displacement direction, together with a further component, transverse to the scrap-cutting blade plane spanned by the scrap-cutting blades;

in that displacements of the scrap-cutting upper blade is carried out simultaneously transverse to the trimming blade plane (4) and transverse to the scrap-cutting blade plane;

in that the scrap-cutting upper blade is secured in a carriage displaceable in a guide for the scrap-cutting blade carriage; and in that the simultaneous displacement of the scrap-cutting upper blade transverse to the trimming blade plane and transverse to the scrap-cutting lower blade is carried out by rotation of at least one eccentric shaft (21) operationally connected with the guide for the scrap-cutting blade carriage (20, 20').

2. A method according to claim 1,
characterized
in that a ratio of a displacement path of the guide for the scrap-cutting blade carriage in the direction transverse to the trimming blade plane (4) to the displacement path of the guide for the scrap-cutting blade carriage in the direction transverse to the scrap-cutting blade plane (5) is alternatively individually adjusted before a respective trimming cut.

3. A device for trimming heavy plates, comprising: heavy plate shears that have trimming blades (7, 8) spanning a trimming blade plane (4) for trimming a heavy plate; and a scrap-cutting device arranged, in a transportation direction of the heavy plate, behind the trimming blades (7, 8) and having a scrap-cutting upper blade and a scrap-cutting lower blade, which span a scrap-cutting plane, for cutting off scrap edges produced during trimming in scrap pieces; characterized in that a drive device for displacing the scrap-cutting upper blade in a displacement direction, with at least one component transverse to the trimming blade plane (4), is provided;

in that the drive device is formed for displacing the scrap-cutting upper blade in the displacement direction, together with a further component, transverse to the scrap-cutting blade plane spanned by the scrap-cutting blades;

in that the scrap-cutting device comprises a guide for a scrap-cutting blade carriage in which the scrap-cutting blade carriage is displaceably secured, wherein the scrap-cutting upper blade is secured; and in that the drive device has at least one eccentric shaft (21), which is so operationally connected with the guide (20, 20') for the scrap-cutting blade carriage, that by rotation (24) of the eccentric shaft (21), the guide (20, 20') for the scrap-cutting blade carriage and, thereby the scrap-cutting upper blade is simultaneously displaced transverse to the trimming blade plane (4) and transverse to the scrap-cutting blade plane.

4. A device according to claim 3, characterized in that the guide (20) for the scrap-cutting blade carriage is alternatively connected with an eccentric shafts (21) designed and dimensioned for producing different displacement lengths and ratios of the displacement lengths.

\* \* \* \* \*